June 3, 1952 D. A. WING 2,599,035
FISH BAIT
Filed Aug. 25, 1947
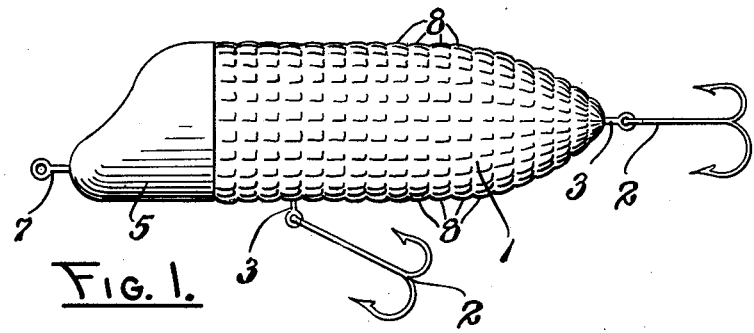
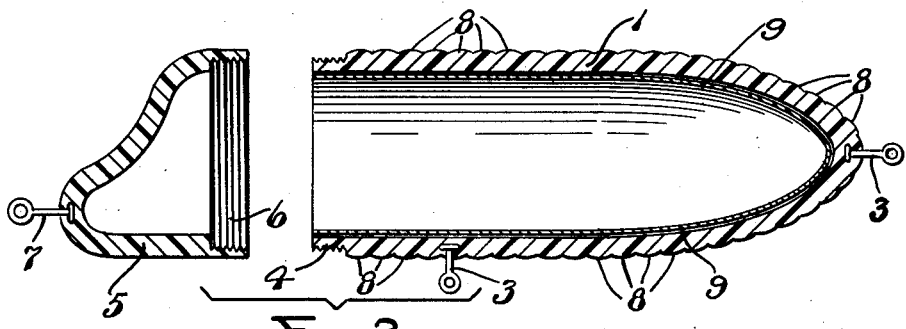
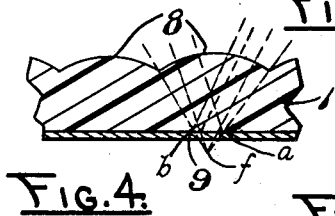
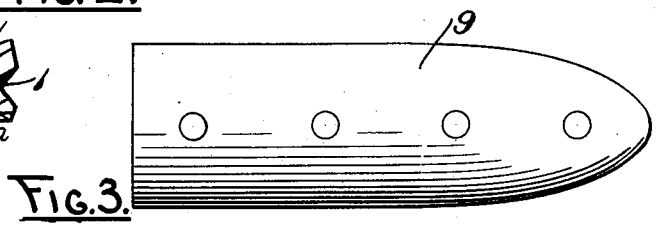
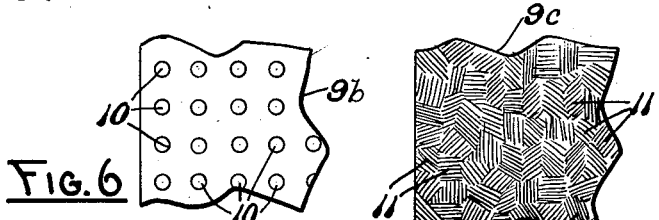
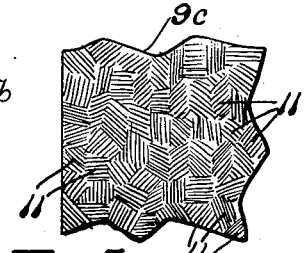
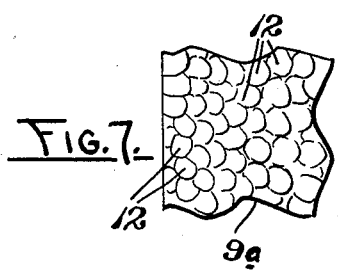
INVENTOR
DEE A. WING
BY Linerane and
Van Antwerp
ATTORNEYS Patented June 3, 1952

2,599,035

UNITED STATES PATENT OFFICE 2,599,035

FISH BAIT

Dee A. Wing, Brooks Township, Newaygo County, Mich.

Application August 25, 1947, Serial No. 770,344

2 Claims. (Cl. 43—42.33)

This invention relates to an artificial fish bait.

Artificial bait, of many variations in form and structure, has been produced, but in general each bait is complete in itself and is not changeable. The bait usually includes a body with vari-colored surfaces to which a line may be attached for drawing it through the water and with hooks connected with the body to catch a fish when it strikes. The body, usually solid or in effect solid, has one unchangeable surface and to use another bait with the same line, the first must be detached from the line and a second one used to replace the first one.

One primary object and purpose of the present invention is to produce a bait which may be, with a single body, indefinitely varied and changed in its appearance. Therefore, the body of the bait, which is hollow and which preferably is divided into two parts and is of transparent material, may have inserted therein any one of an indefinite number of patterns or combinations of patterns, each of which presents a different appearance and effect, so that with the varied patterns of inserts used, an indefinite number of different patterns may be provided with a single body to which the hooks and line are connected.

A further object and purpose of the invention is to provide a bait giving a brilliant reflection in color or combination of colors and having a flashing, naturally scaly appearance which reflects light at a wide angle from its surface. With the bait a reflecting of more intense light in a desired field and in any desired pattern may also be obtained.

A yet further object and purpose of the invention is to concentrate light and reflect it from bright points or spots of concentration, with an appearance of movement which follows from a change in angle of reflection or a change in perspective, or both. Of course, by use of the inserts mentioned, a wide variety of fish baits with different desired light reflections and colors may be provided from a single bait body and a number of interchangeable reflecting inserts which are in a wide variety of patterns to produce an indefinite number of effects, whereby the bait is adaptable to varying conditions of light and locality.

Many other objects and purposes than those stated will be apparent from an understanding of the invention, obtained from the following description, taken in connection with the accompanying drawing, in which, Fig. 1 is an elevation of the fish bait made in accordance with my invention, Fig. 2 is a longitudinal vertical section therethrough with the two connectable parts of the bait body separated, Fig. 3 is an elevation of an insert which may be used, Fig. 4 is a fragmentary enlarged transverse section through a side of the hollow body and associated insert, and Figs. 5, 6 and 7 are fragmentary plan views of portions of variable inserts which may be used.

Like reference characters refer to like parts in the different figures of the drawing.

In the construction of the bait a hollow body 1, open at one end, is made from transparent material which, in practice, may be a plastic such as Lucite or Plexiglas. To this body the fishhooks 2 are connected in the usual manner by eye members 3. At its open end it is reduced in exterior diameter and exteriorly threaded, as at 4. The body of the bait is completed by a closing head 5, which is interiorly threaded at an open end to screw upon the screw-threaded end portion 4 of the body 1, so that the outer sides of the body and the head are substantially flush with each other. To the head a line may be attached in any suitable manner, for example, by the eye 7 or in any other convenient way.

In the form shown in Figs. 1, 2 and 4, the exterior surface of the body 1 is formed with a multiplicity of convex, closely adjacent surface portions, indicated at 8. This provides a multiple lens structure in effect, each of the surfaces at 8 forming a lens, the focal point of which, preferably, is a short distance inwardly of the inner side of the wall of the body at which the lens is located. Because of the inwardly located focal points of the lenses, and as diagrammatically illustrated in Fig. 4 in short dash lines rays of light directed by each lens toward the focal point indicated at $f$ will strike the outer surface of the insert 9 and be reflected therefrom in a circular area the diameter of which is a distance between the points $a$ and $b$ upon which the light rays impinge and are reflected therefrom over such smaller area with a resultant condensation of such light rays and with an increased brightness because of such condensation. Of course the area of the diameter of which is between the points $a$ and $b$ may be controlled in accordance with the position of the focal points, at $f$ of the lenses the reflecting area being smaller the closer the focal point $f$ is to the outer surface of the insert which is if the focal point was directly at such outer surface there would be a mere point of reflected light which would be unsatisfactory.

Within the hollow body 1 an insert 9 of desired pattern, and which may be readily replaced by interchanging for one of a different pattern, is placed. Such insert as shown in the disclosure is a hollow shell having thin walls of suitable material, such as paper, cellophane, thin embossed aluminum backed by paper or other material which may be used, and on which at its outer surface a pattern, preferably of bright color or color combinations, is made. For example in Fig. 6, the major portion of the surface 9b may be of one color varied by a multiplicity of spaced circles 10 of a different color. In Fig. 5 the surface 9c is of variegated colors of different types over different portions of the surface, as shown at 11. In Fig. 7 the surface 9a is pressed concave to produce a scaly effect, as indicated at 12, and the patterns thereof, each one of which is indicative of a scale, may be of the same or different colors. Of course, such illustrations show only a small number of the innumerable types or varieties of patterns which may be used.

It is to be understood that the light rays from the outside passing through the wall 1, are concentrated at a very large number of points or spots upon the outer surface of the inserts. If the focal points of the lens portions 8 should be directly at the outer surface of an insert 9, the light at each lens 8 will then be focused at a point. Preferably, the focal points of the lenses at 8 are located a short distance inwardly thereof so that the light is concentrated in small spots rather than points upon the outer surfaces of the vari-colored inserts.

The inserts at their outer surfaces may, if desired, have a luminous character, obtained in any one of the many ways that luminosity may be provided. The outer surfaces may have phosphorescent or fluorescent coatings, or be subjected to radium or thorium processing for such purpose.

The bait is readily and economically produced and is very practical and useful.

The invention is defined in the appended claims and is to be considered comprehensive of all forms of structure coming within its scope.

I claim:

1. A fish bait comprising a body including separable head and rear portions, said rear portion being hollow and transparent and having a wall of generally uniform thickness, the interior surface of said wall being smooth and the exterior thereof having a multiplicity of lenses convex at their outer sides substantially covering the rear portion, in which the focal distance of said convexities forming the lenses is slightly greater than the thickness of the body of the wall, and a removable and replaceable insert in the body having the outer surface thereof in close proximity to the inner side of the wall and adapted to carry a selected pattern at its outer surface, the focal point of said lenses being a slight distance within the outer pattern on the outer side of an insert, whereby light striking against said pattern is reflected therefrom through the walls of the body.

2. A fish bait comprising, a body having a front head and a hollow rear portion, the rear portion having transparent walls of generally uniform thickness, the interior surfaces of said walls being smooth and the exterior thereof having a multiplicity of lenses, convex at their outer sides, substantially covering said rear portion, the focal distances of the convexities forming the lenses being slightly greater than the thickness of said walls, and an insert within the body having the outer surface thereof in close proximity to the inner sides of the walls and adapted to carry a selected pattern at its outer surface, the focal points of said lenses being a slight distance within the pattern on the outer surface of the insert, causing a reflection of light from the pattern from areas greater than points.

DEE A. WING.

REFERENCES CITED

The following references are of record in the file of this patent:

UNITED STATES PATENTS

| Number | Name | Date |
|---|---|---|
| 2,112,385 | Smith | Mar. 29, 1938 |
| 2,117,206 | Neff | May 10, 1938 |
| 2,127,761 | Beck | Aug. 23, 1938 |
| 2,167,149 | Grote | July 25, 1939 |
| 2,174,899 | Selsky | Oct. 3, 1939 |
| 2,241,941 | Bates | May 13, 1941 |
| 2,309,521 | Mabee | Jan. 26, 1943 |